United States Patent
Tham et al.

(10) Patent No.: US 10,101,232 B2
(45) Date of Patent: Oct. 16, 2018

(54) PRESSURE DIFFERENCE SENSOR WITH PROTECTION AGAINST STATIC OVERLOADS

(71) Applicant: Endress + Hauser GmbH + Co. KG, Maulburg (DE)

(72) Inventors: Anh Tuan Tham, Berlin (DE); Peter Klofer, Steinen (DE); Rafael Teipen, Berlin (DE); Benjamin Lemke, Berlin (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 36 days.

(21) Appl. No.: 15/129,953

(22) PCT Filed: Mar. 24, 2015

(86) PCT No.: PCT/EP2015/056186
§ 371 (c)(1),
(2) Date: Sep. 28, 2016

(87) PCT Pub. No.: WO2015/150154
PCT Pub. Date: Oct. 8, 2015

(65) Prior Publication Data
US 2017/0138808 A1 May 18, 2017

(30) Foreign Application Priority Data
Apr. 4, 2014 (DE) .................. 10 2014 104 831

(51) Int. Cl.
*G01L 13/02* (2006.01)
*G01L 19/06* (2006.01)
*G01L 19/14* (2006.01)

(52) U.S. Cl.
CPC ........ *G01L 13/025* (2013.01); *G01L 19/0618* (2013.01); *G01L 19/143* (2013.01)

(58) Field of Classification Search
None
See application file for complete search history.

(56) References Cited

U.S. PATENT DOCUMENTS 3,618,390 A 11/1971 Frick
4,072,057 A * 2/1978 Yasuhara ............... G01L 9/007
361/283.3
(Continued)

FOREIGN PATENT DOCUMENTS

AT 371601 11/1983
DE 2052515 5/1971
(Continued)

OTHER PUBLICATIONS

German Search Report, German Patent Office, Munich, DE, dated Jul. 2, 2014.
(Continued)

*Primary Examiner* — Andre Allen
(74) *Attorney, Agent, or Firm* — Bacon & Thomas, PLLC

(57) ABSTRACT

A pressure difference sensor, comprising a pressure difference measuring cell having a measuring membrane, two platforms, between which the measuring membrane is arranged, and a transducer, as well as an elastic clamping apparatus, which has two clamping areas, each of which acts on a respective rear side of the platform facing away from the measuring membrane. The clamping apparatus has at least one elastic element, via which the clamping areas are mechanically coupled, in order to clamp the pressure difference measuring cell with an axial clamping force. The clamping areas are rigid, wherein the clamping apparatus comprises a clamp with two clamping bodies, each of which has one of the clamping areas. At least one of the clamping bodies has an elastic element, the clamping bodies are connected with one another under stress, in order to exert a clamping force on the pressure difference measuring cell,
(Continued)

wherein the two clamping bodies have a central, form retaining section, which includes the clamping areas. On the form retaining section of at least one clamping body, especially both clamping bodies, elastic sections adjoin, which form the elastic elements.

23 Claims, 4 Drawing Sheets

(56) References Cited

U.S. PATENT DOCUMENTS

| | | | |
|---|---|---|---|
| 4,458,537 | A | 7/1984 | Bell |
| 4,833,920 | A | 5/1989 | Knecht |
| 5,134,887 | A | 8/1992 | Bell |
| 9,759,623 | B2* | 9/2017 | Drewes .................. G01L 19/06 |
| 2006/0053893 | A1 | 3/2006 | Banholzer |
| 2011/0113889 | A1* | 5/2011 | Funken ..................... F16J 3/02 |
| | | | 73/715 |
| 2012/0265455 | A1 | 10/2012 | Tham |
| 2013/0327151 | A1* | 12/2013 | Berlinger .............. G01L 9/0075 |
| | | | 73/756 |
| 2016/0041054 | A1 | 2/2016 | Lemke |
| 2017/0146418 | A1* | 5/2017 | Drewes ............... G01L 19/0618 |

FOREIGN PATENT DOCUMENTS

| | | |
|---|---|---|
| DE | 10334284 A1 | 2/2005 |
| DE | 102006057828 A1 | 6/2008 |
| DE | 102012113033 A1 | 6/2014 |
| DE | 102014104831 A1 | 10/2015 |
| EP | 0065845 A1 | 12/1982 |
| GB | 1548589 | 7/1979 |
| WO | 8800335 A1 | 1/1988 |
| WO | 2005012864 A1 | 2/2005 |
| WO | 2011076477 A1 | 6/2011 |

OTHER PUBLICATIONS

International Search Report, EPO, The Netherlands, dated May 29, 2015.
English Translation of the International Preliminary Report on Patentability, WIPO, Geneva, CH, dated Oct. 13, 2016.

* cited by examiner

PRESSURE DIFFERENCE SENSOR WITH PROTECTION AGAINST STATIC OVERLOADS

TECHNICAL FIELD

The present invention relates to a pressure difference sensor, especially a pressure difference sensor with protection against static overloads.

BACKGROUND DISCUSSION

Pressure difference sensors are usually optimized to measure small pressure differences $p_1-p_2$ in the presence of large static pressures $p_1$, $p_2$. In such case, it is important to find the right balance between sensitivity and overload resistance. Thus, for example, $|p_1-p_2|/p_1<1\%$ can hold for the measuring range of the pressure difference $|p_1-p_2|$. When in a process installation one of the pressures $p_1$, $p_2$ is absent, then the pressure difference sensor is loaded with 100s of times the measuring range. Pressure difference transducers are known, which withstand such overloads. A proven protection of the sensitive pressure difference measuring cells is to connect an overload membrane hydraulically in parallel with the pressure difference sensor, wherein the pressure difference measuring cell and the overload membrane are supplied with the two pressures $p_1$, $p_2$ via hydraulic paths, wherein the pressures are introduced through isolating diaphragms into the hydraulic paths. An overload membrane includes a sufficiently large hydraulic capacitance, in order in the case of a one-sided overload to accommodate the volume of a pressure transfer liquid in a hydraulic path sufficiently that the isolating diaphragm of this hydraulic path comes to rest on a diaphragm bed, so that a further rise of the pressure difference acting on the pressure difference sensor is reliably prevented. Examples of pressure difference transducers with overload membranes are disclosed in European Patent EP 1299 701 B1, and German Patents DE 10 2006 040 325 A1 and DE 10 2006 057 828 A1.

The use of overload membranes leads, however, necessarily to greater volume strokes of the pressure transfer liquid and therewith—in the case of equal performance—to greater separating membrane areas, which means greater device dimensions and higher costs. Moreover, the measuring mechanism dynamic range is negatively influenced by the overload membrane and the greater volume of the pressure transfer liquid.

There are, consequently, efforts known to implement the overload protection for the measuring membrane by membrane beds. In such case, the measuring membrane should in the case of exceeding a limit value for a one-sided positive pressure at least find sufficient support on the diaphragm bed that the bursting stress of the measuring membrane is not reached even in the case of an additional pressure rise.

For such purpose, especially suitable are aspherical membrane beds, which approximate the bend line of the measuring membrane at the limit value for the positive pressure.

U.S. Pat. No. 4,458,537 discloses a capacitive pressure difference sensor having an aspherical diaphragm bed of glass built in a structure of coaxial rings, wherein the heights of the rings form a contour, which corresponds to the bend line of the measuring membrane.

Offenlegungsschrift (laid open German application) DE 10 2009 046 229 A1 discloses a pressure sensor, respectively pressure difference sensor, having an aspherical diaphragm bed of glass, which is formed by thermal yielding.

U.S. Pat. No. 7,360,431 B2 discloses a pressure sensor, respectively pressure difference sensor, with an aspherical diaphragm bed, which is prepared in silicon by means of grayscale lithography.

Offenlegungsschrift (laid open German application) DE 10 2010 028 773 A1 discloses a pressure sensor, respectively pressure difference sensor, with an aspherical diaphragm bed, which is prepared in silicon by means of laser ablation, followed by an oxidation step and a terminal etching.

Although the mentioned membrane support concepts can actually protect the measuring membrane to a certain degree, nevertheless the static pressure introduced into the pressure difference sensor loads the joints between measuring membrane and platforms or regions bordering thereon, so that stress peaks can occur there, which lead to a destruction of the pressure difference sensor.

Apart from static overload pressures present on both sides, a one-sided supplying of the pressure difference measuring cell with a static overload pressure can also damage or destroy the measuring membrane, the platform or the joints between measuring membrane and platforms or regions bordering thereon, when the one-sided overload leads to deformations of the platform, whereby, for example, the support function for the membrane beds is degraded.

In order to counter this, Hein et al. (Transducers '97, pages 1477-1480, 1997) disclose an encapsulated capacitive pressure difference sensor, in the case of which the platforms are axially clamped between pressure connection pieces, wherein, in each case, between a platform and a pressure connection piece supplementally a sealing ring is clamped.

German patent DE 37 51 546 T2 likewise discloses a pressure difference sensor, which has a measuring membrane between two platforms, wherein the two platforms are axially clamped in an elastic clamping apparatus, in order to increase the bursting strength of the pressure difference sensor.

Common to the two above described arrangements is that, in the case of supplying the pressure difference sensor with static pressure, relative movements can occur between the platforms and the clamping apparatus. This can lead especially to hysteresis errors in the zero point and measuring range of a measurement signal of the pressure difference sensor dependent on the pressure difference.

SUMMARY OF THE INVENTION

It is, therefore, an object of the present invention to provide a remedy for this.

The object is achieved by the pressure difference sensor which includes: a difference pressure measuring cell having a measuring membrane; a first platform; a second platform, and a transducer; and an elastic clamping apparatus;

wherein the measuring membrane is arranged between the first platform and the second platform and pressure-tightly connected with the two platforms, wherein a first pressure chamber is formed between the measuring membrane and the first platform and a second pressure chamber is formed between the measuring membrane and the second platform, wherein the first platform and the second platform each have a pressure duct, through which the particular pressure chamber is contactable with a first, respectively second, pressure ($p_1$, $p_2$);

wherein the transducer is provided for transducing a deformation of the measuring membrane dependent on a difference between the first pressure ($p_1$) and the second pressure ($p_2$) into an electrical signal;

wherein the clamping apparatus has a first clamping area, which acts on a first rear side of the first platform facing away from the measuring membrane, and a second clamping area, which acts on a second rear side of the second platform facing away from the measuring membrane, wherein the clamping apparatus has at least one elastic element, via which the clamping areas are mechanically coupled, in order to clamp the pressure difference measuring cells with an axial clamping force, wherein the first and the second clamping areas are rigid, wherein the clamping apparatus comprises a clamp with a first clamping body, which has the first clamping area and a second clamping body, which has the second clamping area, wherein the first and/or the second clamping bodies have an elastic element, wherein the first and second clamping bodies are connected with one another under stress, in order to exert a clamping force on the pressure difference measuring cell, and wherein the two clamping bodies have a central, form retaining section, which includes the clamping areas, wherein on the form retaining section of at least one clamping body, especially both clamping bodies, elastic sections adjoin, which form the elastic elements.

In other words, the pressure difference sensor of the invention includes a pressure difference measuring cell having a measuring membrane, and two platforms, between which the measuring membrane is arranged, and a transducer, as well as an elastic clamping apparatus, which has two clamping areas, each of which acts on a respective rear side of the platform facing away from the measuring membrane, wherein the clamping apparatus has at least one elastic element, via which the clamping areas are mechanically coupled, in order to clamp the pressure difference measuring cells with an axial clamping force, wherein the clamping areas are rigid, wherein the clamping apparatus comprises a clamp with two clamping bodies, each of which has one of the clamping areas, wherein at least one of the clamping bodies has an elastic element, and the clamping bodies are connected with one another under stress, in order to exert a clamping force on the pressure difference measuring cell, wherein the two clamping bodies have a central form retaining section, which includes the clamping areas, wherein there adjoin on the form retaining section of at least one clamping body, especially both clamping bodies, elastic sections, which form the elastic elements.

The clamping apparatus effects that tensile stresses or stress concentrations, which act perpendicularly to a plane of a joint between the measuring membrane and the platforms or between other layers of the pressure difference measuring cell and, in given cases, contribute to failure of the sensor, are superimposed with a compressive prestress.

The clamping apparatus serves especially to produce a reproducible prestress, which is stable over longer periods of time. In this regard, two oppositely lying clamping bodies, which enclose the sensor, are elastically deformed to a targeted degree and connected with one another—especially by welding.

In a further development of the invention, the elastic elements comprise spring legs, wherein the axial clamping force, which acts on the platform, is applied by an elastic bending deflection of the spring legs from their resting position.

In a further development of the invention, the platforms each have a chamber body, in which depressions for the pressure chambers are embodied, and, in each case, a stiffening element, wherein the stiffening elements are, in each case, arranged between the chamber bodies and the clamping areas.

In a further development of the invention, the stiffening elements have a material, whose coefficient of thermal expansion differs by no more than 5 ppm/K, preferably no more than 2 ppm/K, from the coefficient of thermal expansion of the material of the chamber bodies.

In a further development of the invention, the pressure difference sensor is specified for a static overload pressure $p_L$, and wherein the measuring membrane (10) has an area A loadable with a pressure ($p_1$, $p_2$), wherein a clamping force F, with which the clamping apparatus (50) clamps the pressure difference measuring cell, can be expressed as $$F = S \cdot p_L \cdot A$$

wherein the safety factor S amounts to not less than 0.2, preferably not less than 0.5 and especially preferably not less than 0.8.

In a further development of the invention, the clamping force F fulfills the above mentioned conditions over a temperature range between 0° C. and 100° C., especially between −20° C. and 150° C. and preferably between −40° C. and 180° C.

In a further development of the invention, the clamping force varies over a temperature range between 0° C. and 100° C., especially between −20° C. and 150° C. and preferably between −40° C. and 180° C. at a constant pressure, which is less than the overload pressure $P_L$, by no more than the half, preferably no more than ⅖, especially preferably no more than ⅓ the maximum clamping force in the temperature range.

In a further development of the invention, the clamping bodies comprise a material, whose coefficient of thermal expansion deviates by no more than 5 ppm/K, especially no more than 2 ppm/K and preferably no more than 1 ppm/K from the coefficient of thermal expansion of the material of the stiffening element.

In a further development of the invention, a maximum stress, which occurs in the clamping apparatus, is less than $\sigma_{02}$ of the material of the clamping apparatus in the vicinity of this maximum stress.

In a further development of the invention, the clamping apparatus comprises a metal material, especially Kovar or steel.

In a further development of the invention, the stiffening elements comprise single crystalline or polycrystalline silicon or a ceramic material, especially AlN, SiC, SiN or cordierite.

BRIEF DESCRIPTION OF THE DRAWINGS

The invention will now be explained based on the pressure difference sensor illustrated in the drawing, the figures of which show as follows.

DETAILED DISCUSSION IN CONJUNCTION WITH THE DRAWINGS

Figure 1:
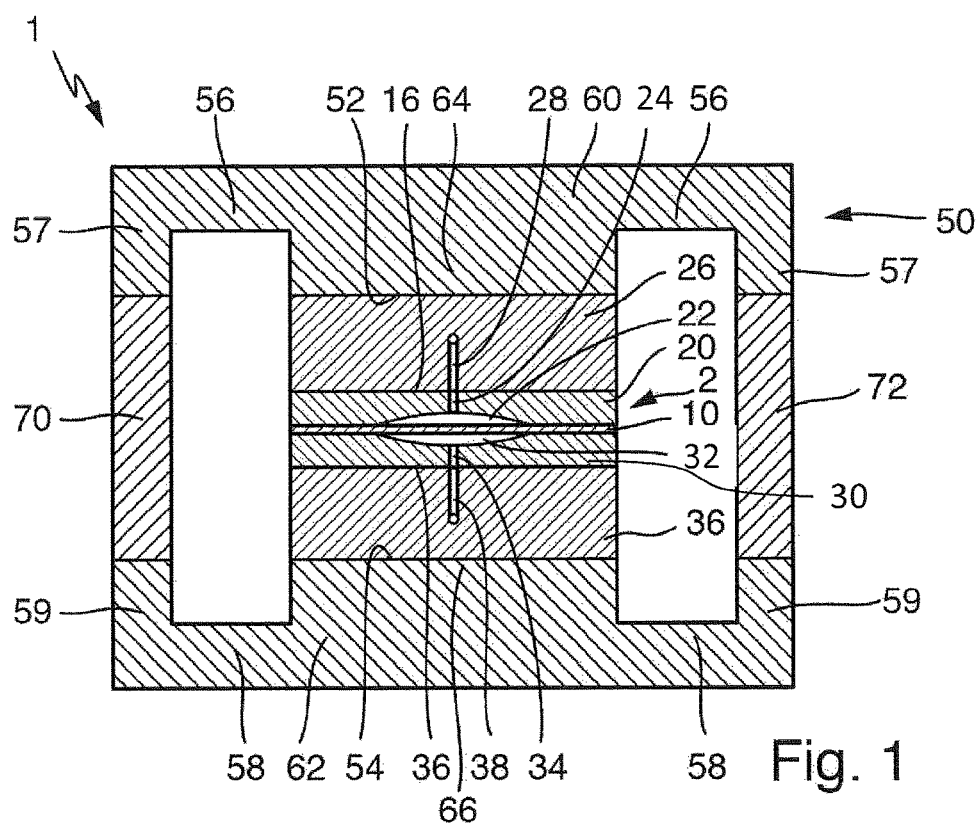
FIG. 1 is a schematic longitudinal section through an example of an embodiment of a pressure difference sensor of the invention.

The pressure difference sensor 1 shown in FIG. 1 includes a pressure difference measuring cell 2 having a measuring membrane 10, a first platform 20 and a second platform 30, wherein the measuring membrane 10 is arranged between the first platform and the second platform and connected pressure-tightly with both platforms along a peripheral joint, so that a first pressure chamber 22 is formed between the first platform and the measuring membrane and a second pressure chamber 32 is formed between the second platform and the measuring membrane. The pressure chambers are respectively contactable via pressure supply lines 24 and 34 with a first, respectively second pressure, wherein the measuring membrane is deflectable as a function of a difference between the two pressures, and wherein the pressure difference measuring cell has an especially capacitive or piezoresistive transducer, in order to transduce the deflection of the measuring membrane into an electrical signal. Details concerning these transducer principles are known per se to those skilled in the art in the field the pressure measuring technology and need, consequently, not be explained in further detail here.

Measuring membrane 10 comprises especially single crystalline silicon, wherein the platforms can comprise silicon or glass. The measuring membrane is joined with the platforms, for example, by fusion bonding, wherein between a measuring membrane of silicon and silicon platforms a silicon oxide layer can be provided. Formed in this silicon oxide layer can be a membrane bed, which limits its pressure chamber and supports the measuring membrane in the case of a unilateral overload. The membrane bed can be formed, for example, by controlled etching, such as described in German patent application DE 10 2012 109 587. The pressure supply lines open into the pressure chambers especially at the deepest points of the membrane beds at their centers. Between an edge region of the platforms, where the platforms are joined with the measuring membrane, and the membrane beds, in each case, an annularfurrow (not shown) can be provided in the platforms, in order to protect the respective joint between the measuring membrane and the platform from stress concentrations. As shown in the drawing, the platforms can, in each case, be manufactured as two parts, namely a chamber body and a stiffening element.

Thus, the platforms are embodied in the illustrated example of an embodiment in two parts, i.e. they comprise, in each case, a chamber body 20, 30, in which, bounded by a membrane bed, a recess is prepared, which forms the volume of the respective pressure chamber 22, 32, wherein the chamber bodies 20, 30 are, in each case, joined with a respective side of the measuring membrane 10. Furthermore, the platforms comprise, in each case, a stiffening element 26, 36, which comprises especially a planparallel plate and is joined with a first plate area flushly with a rear side of a chamber body 20, 30 facing away from the measuring membrane.

Duct sections 28, 38 of the pressure supply lines 24, 34 can extend from each stiffening element 26, 36, in order to supply media pressures to the respective pressure chambers 22, 32. For example, the duct sections 28 and 38 can communicate at their end sections facing away from the chamber body with capillary lines, which are connected pressure-tightly with the stiffening bodies and which support the pressure sensor.

The duct sections 28, 38 have, in each case, especially two subsections, which connect with one another and extend in different directions, especially at right angles to one another. A first subsection joins, in each case, alignedly, with a pressure supply line 24, 34 in a chamber body, and extends especially essentially perpendicularly to the area of connection between the chamber body and the stiffening element, while the second subsection opens on another lateral surface of the stiffening element, especially on an underside, where capillary lines supporting the pressure sensor can be connected to the stiffening element.

The pressure difference measuring cell 2 is, finally, axially prestressed by a clamping apparatus 50, wherein the clamping apparatus 50 has a first clamping body 60 and a second clamping body 62. The clamping bodies 60, 62 have, in each case, a form retaining section 64, 66, which is arranged in the middle of the clamping body 60, 62. The form retaining sections 64, 66 have respective, planar, clamping areas 52, 54, which bear flushly against respective rear sides of the stiffening elements 26, 36 facing away from the chamber bodies 20, 30.

Bordering both sides of the form retaining section 64, 66, the clamping bodies each have elastic sections 56, 58, which have in the axial direction of the pressure difference measuring cell, thus in the direction of the surface normals to the clamping areas, a lesser material thickness than the form retaining sections 64, 66 and, consequently, act as spring legs. Bordering on the elastic sections 56, 58, the clamping bodies 60, 62 have on both sides end sections 57, 59 having at least the material thickness of the form retaining sections 64, 66. The clamping bodies are preferably, in each case, monolithically embodied, in order to prevent relative movements between interfaces within the clamping body, since such relative movements can lead to hysteresis effects in the pressure measurements.

The two end sections 57 of the first clamping body 60 are, in each case, connected with the oppositely lying end sections 59 of the second clamping body by tension rods 70, 72 containing tensile stress, wherein the end sections were welded with the tension rods while under axial compression. By this construction, the clamping apparatus 50 supplies the pressure difference measuring cell 2 with an axial clamping force, which counteracts a bursting of the pressure difference measuring cell in the case of high static pressures introduced into the pressure chamber.

Instead of the welded joint, the end sections with the tension rods can also have a screwed connection with bolts, for which then traversing bores are led in the axial direction through the end sections of the clamping bodies and space holders, and bolts are placed in the traversing bores, wherein the space holders replace the tension rods, since, in this case, the tensile stress is provided by the bolts, and the space holders only define the separation between the end sections of the clamping bodies, whereby the clamping force acting on the pressure difference measuring cell is established.

The clamping force applied by the clamping apparatus can, however, does not have to, absorb the entire force in the axial direction occurring due to a static pressure in the pressure chambers. In any event, the clamping force should suffice to keep the stresses arising in the joints between the measuring membrane and the chamber bodies reliably below the bursting stress for the respective material combinations.

Figure 2:
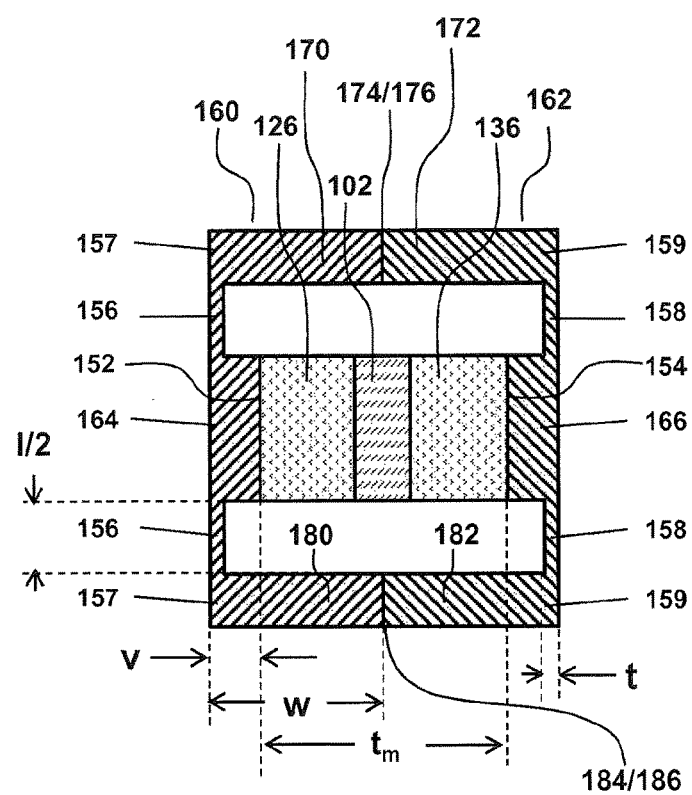
FIG. 2 is a schematic side view of a second example of an embodiment of a pressure difference sensor of the invention.

In the following, based on the example of an embodiment of a pressure difference measuring transducer of the invention sketched in FIG. 2, other aspects of the clamping apparatus of the invention will now be explained.

A stiffened region 164, 166 of a clamping body 160, 162, which contacts a platform 126, 136, is as stiff as possible, in order to provide a reliable, 2-dimensional contact along its clamping surface 152, 154 against the especially ceramic platform. This contact can be assured, for example, via an adhesive bonding.

For introducing a compressive stress, elastic elements in the form of spring legs 156, 158, which are thin in comparison with the bending-stiff regions 164, 166, are deflected by a defined force F at bending-stiff end sections 157, 159, which are connected to the free ends of the spring legs 156, 158, wherein the end sections are embodied as connecting elements 170, 180, 172, 182, whose longitudinal direction extends in the direction of the clamping force F, wherein the connecting elements 170, 180 of the first clamping body are connected in the clamped state, in each case, with an oppositely lying connecting element 172, 182 of the second clamping body, especially by welding. Due to the connection of the two clamping bodies, there acts, after the removal of the external force, an equivalent axial pre-stress $\sigma_k = F/A$ on the pressure measuring cell, wherein A refers to the joint area between the measuring membrane and the platforms. In the case of a joint area of $(4.15 \text{ mm})^2 - \pi(1.1 \text{ mm})^2 = 13.4 \text{ mm}^2$ and a desired compressive stress of, for example, $\sigma_k = 100$ MPa, there results a minimum necessary force of $F_{min} = 1340$ N, which must act on the sensor.

The deflection of the elastic elements, respectively spring legs or bending beams 156, 158, required therefor can be estimated via a simple bending beam equation.

The elastic elements B are so designed that they are not plastically deformed at the required force F. As limit, the bending stress on the beam surface is considered, which should be less than the yield point, respectively $\sigma_{0.2\%}$, of the material of the elastic elements, wherein the material comprises especially a metal.

The material of the clamping apparatus can be so selected that it has a coefficient of thermal expansion $\alpha$ similar to that of the stiffening elements of the platforms. This has the advantage that the geometry of the clamping apparatus changes in the case of temperature changes similarly to the geometry of the stiffening elements, so that the clamping force fluctuates only minimally. For example, preferably metals such as Kovar, tungsten and titanium, respectively other metals with a coefficient of expansion am near the $\alpha_K$ of the ceramics AlN, respectively $Si_3N_4$, are selected, which are preferred materials for the stiffening elements.

From the difference of the coefficients of thermal expansion of ceramic $\alpha_K$ and metal clamping apparatus $\alpha_M$, the thickness $t_m$ of the pressure difference measuring cell including the stiffening elements in the direction of the clamping force and the maximum application temperature range $\Delta T_S$, there results a condition for the minimum deflection $w_0$ (t, $T_0=30°$ C.) of the movable elements of the clamp during the connecting procedure:

Goal is a maximum change of the compressive force of ±30% over the design temperature range from −60° C. to 150° C. Since the compressive force is proportional to the deflection of the connecting elements, the following relationship must hold:

$$-0.3 w_0(t,T_0) \leq \Delta w(t,T) \leq 0.3 w_0(t,T_0)$$

Simplification gives the following approximation for the minimum deflection $w_0$ (l, $T_0$):

$$\Leftrightarrow w_0(l, T_0) \geq \frac{\Delta w(l, T)}{0.3} = \frac{t_m |\alpha_e - \alpha_m| \frac{\Delta T}{2}}{0.3}$$

For a 15 mm thick sensor element, a difference $\Delta\alpha$ between the coefficient of thermal expansion $\alpha_e$ of the metal material of the clamping apparatus and the effective coefficient of thermal expansion am of the pressure difference measuring cell equal to 2 ppm/K and a temperature range of 200 K, there results a maximum fluctuation of the deflection of the clamping apparatus of 6 μm. Since the fluctuation is distributed uniformly on the two sides of the clamp, each side must absorb a fluctuation of 3 μm, respectively +/−1.5 μm, in order to accommodate the deflection at the average temperature. In order to satisfy the above condition, the deflection at average temperature must be, for instance, 5 μm. With a corresponding spring constant of the spring leg, it is therewith assured that the minimum clamping force corresponds exactly to the required 1340 N.

In such case, it is evident that manufacturing tolerances make an exact adjusting of the clamping force difficult, since the length of the pressure difference measuring cell $l_m$ must equal twice the length w of the connecting pieces minus twice the length v of the stiffening elements plus twice the average deflection of the clamping body at the average room temperature $(T_{max}+T_{min})/2$.

In the above regard, the connections between the two clamping bodies are of special interest. A simple variant, in the case of which the surface normals of the joining surfaces 174/176 184/186 to be connected run parallel to direction of the clamping force F, such as shown in FIGS. 1 and 2, has the disadvantage that manufacturing tolerances relative to the length l/2 and the thickness t of the spring legs 156, 158, which defines their spring constant, as well as the length w of the connecting elements 170, 172, 180, 182 and the thickness v of the stiffening elements 164, 166, which together with the likewise tolerance burdened thickness $t_m$ of the pressure difference measuring cell define the deflection of the elastic elements, cannot be cancelled. This leads, in given cases, to very large variations of the compressive axial prestress of the pressure measuring cell.

In order nevertheless to be able to adjust the compressive prestress, the deflection of the elastic elements must be so freely selectable that the above manufacturing tolerances can be cancelled. Suitable for this between the clamping bodies are, for example, connecting elements, whose parallel joining surfaces are shiftable tangentially relative to one another, in order that the product of the spring constant of the elastic elements and their deflection can achieve the desired prestress force.

Figures 3A, 3B:
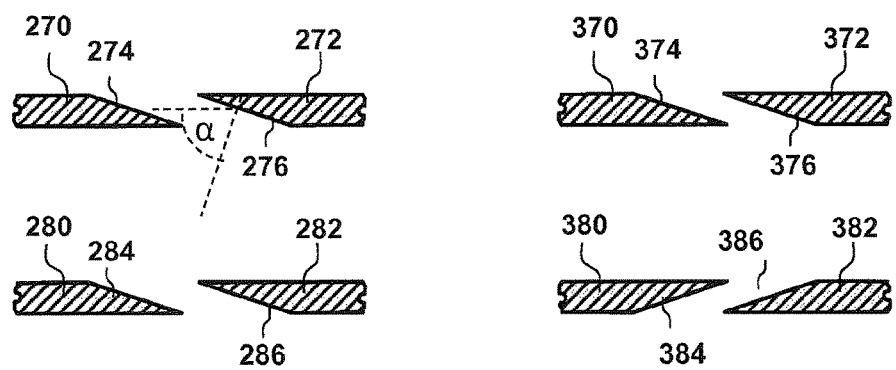
FIG. 3 is a schematic side view of the connecting locations between two clamping bodies of a third example of an embodiment of a pressure difference sensor of the invention.

Advantageous connecting elements 270, 272, 280, 282; 370, 372, 380, 382 are shown, for example, in FIGS. 3a and 3b. In such case, the normal vector to the joining surfaces 274, 276, 284, 286; 374, 376, 384, 386 is welded at an angle α from the direction in which the clamping force acts, wherein, especially, $\alpha \geq 30°$, preferably $\alpha \geq 45°$, and especially preferably $\alpha \geq 60°$. In assembling the clamping apparatus around the pressure difference measuring cell, the connecting elements 270, 272, 280, 282; 370, 372, 380, 382 of the clamping body are then clamped with a force F relative to one another and welded with one another in this clamped position. In FIG. 3a, all four joining surfaces 274, 276, 284, 286 are parallel to one another, so that the clamping of the clamping body can occur largely freely of bending moments. In the case of the arrangement in FIG. 3b, the joining surfaces 374, 384 of a first clamping body are outwardly inclined, and the joining surfaces 376, 386 of the second clamping body are inwardly inclined. Upon a tangential shifting of the joining surfaces, the connecting elements of the first clamping body are consequently pressed inwardly and those of the second inwardly. This leads to bending moments, which shift the resting position of the clamping area of the first clamping body somewhat back and the resting position of the clamping area of the second somewhat forwards. Insofar, there arises a slight asymmetry between the clamping bodies, which, however, is largely mutually compensated, so that the effectiveness of the clamping apparatus is not degraded.

In order to keep the hydraulic and/or electrical connections of the pressure difference measuring cell accessible, the clamping apparatus is only implemented in the form of bending beams, respectively spring legs, in a plane. Examples for dimensioning the clamping apparatus will now be explained based on FIGS. 4 and 5a to 5c.

Figure 4:
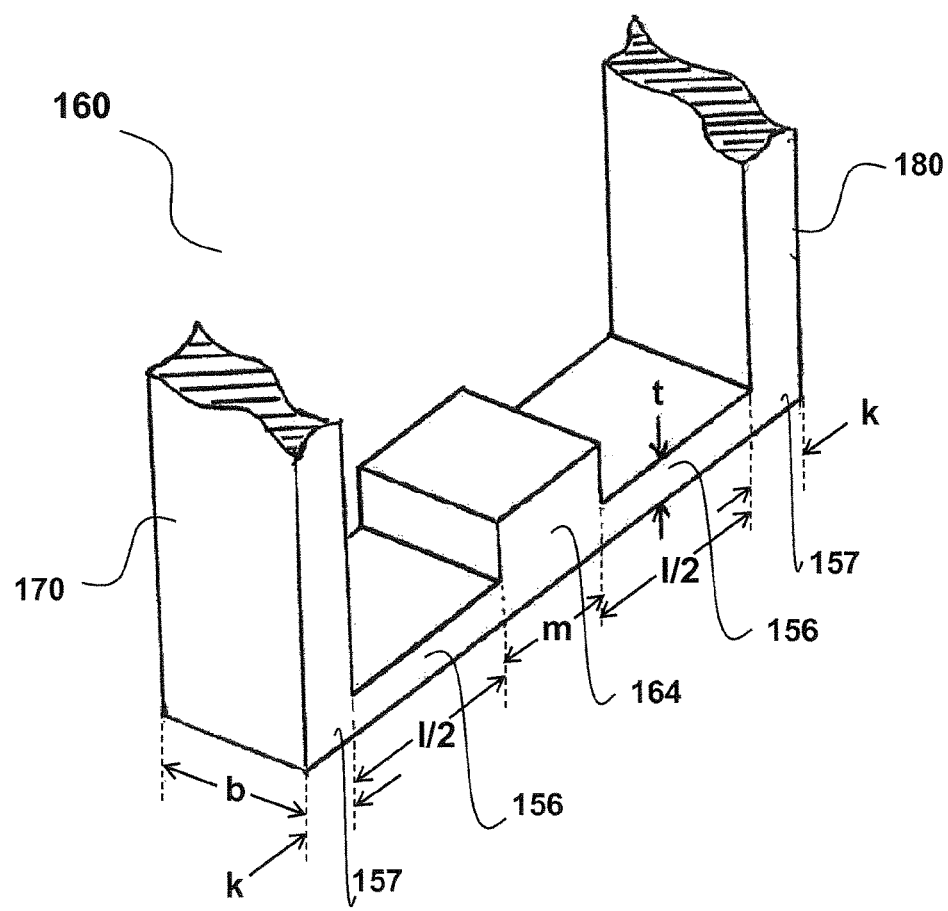
FIG. 4 is a detail view of a clamping body of a fourth example of an embodiment of a pressure difference sensor of the invention.

FIG. 4 shows a detail view of a clamping body, for which the following parameters are significant. Thus, from the minimum clamping force $F_{min}$, the maximum allowable clamping force $F_{max}=F_{min}\cdot(1+\Delta)/(1-\Delta)$, the thickness $t_m$ of the pressure difference measuring cell, the difference $\Delta\alpha$ between the coefficient of thermal expansion of the material of the clamping apparatus and the effective coefficient of thermal expansion of the pressure difference measuring cell, the specified temperature design range between a minimum temperature $T_{min}$ and a maximum temperature $T_{max}$, as well as the modulus of elasticity and the yield point of the material of the clamping apparatus, feasible minimum dimensions of the spring leg and therewith the design of the clamping apparatus can be ascertained.

Figure 5A:
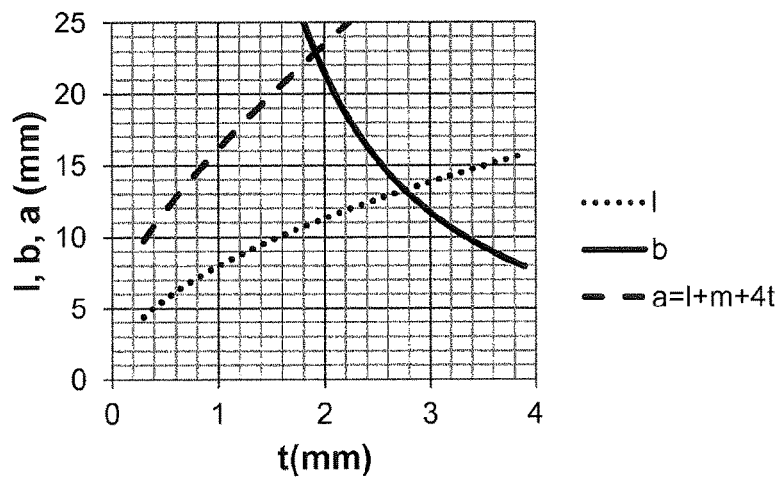
FIGS. 5a to 5c are graphs for dimensioning the clamping apparatus.
Figure 5B:
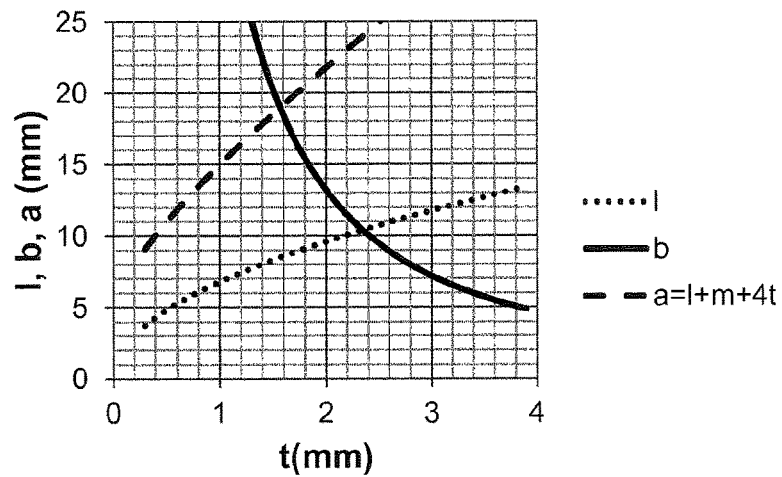
Figure 5C:
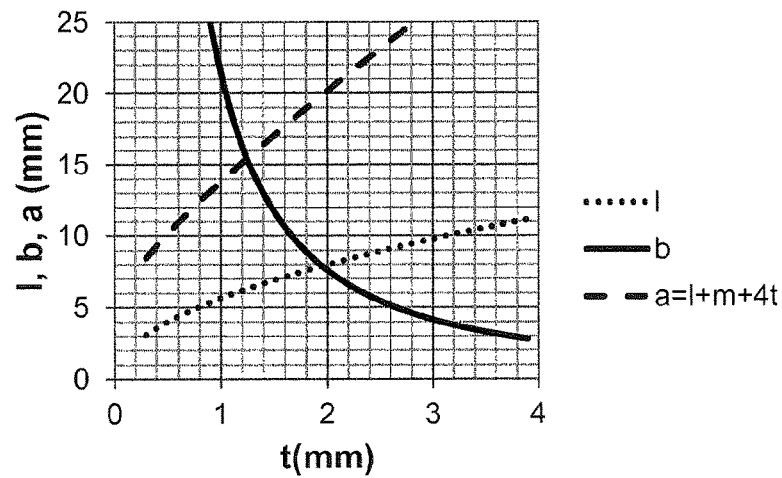

Examples of results in this regard are shown in FIGS. 5a to 5c for clamping bodies of Kovar having the parameters $t_m=15$ mm, $\Delta\alpha=2$ ppm/K, $T_{max}-T_{min}=200$ K and a square base m·m of the pressure difference measuring cell amounting to 4.15 mm·4.15 mm. The allowable relative changes $\Delta$ of the clamping force F around its average value amounts to 0.2 in FIG. 5a and 0.3 in FIG. 5b and 0.5 in FIG. 5c.

For a given thickness t of the spring leg, there then follow lengths l/2 and widths b, with which the required spring constant for the fulfillment of the above conditions can be achieved without exceeding the yield point in the case of maximum deflection. Thus, there results, for example, in the case of a thickness of the spring leg of $t_m=2$ mm and $\Delta=0.2$, a length of the spring leg of $l/2\approx5.6$ mm in the case of a width $b\approx24.4$ mm. The total extension a of the clamping body in the longitudinal direction of the spring leg is, however, greater, for there still needs to be added-in the edge length m=4.15 mm of the pressure difference measuring cell d, which corresponds to the minimum length of the stiffening element C, as well as two times the thickness k of the connecting elements in the longitudinal direction of the spring leg. Since the connecting elements should be stiffer than the spring leg, one can, for example, set k=2 t. Then the total extension becomes a=l+m+4 t. For an as low as possible maximum edge length of the area a, b, with $\Delta=0.2$, there result the following values: $t\approx1.96$ mm and $a=b\approx22.6$ mm. When greater relative changes of the clamping force are allowable, the clamping apparatus can be designed more compactly. Thus, with $\Delta=0.3$: $T\approx1.6$ mm: $a=b\approx19$ mm, and with $\Delta=0.3$: $T\approx1.25$ mm: $a=b\approx15.5$ mm, in order to keep the maximum edge length of the area a, b as small as possible.

Evident from the graphs is that the area a,b attains the greatest area value in the case of minimizing the maximum edge lengths, so that the clamping apparatus assumes a greater volume in a housing. If, in contrast, a volume minimizing is to be pursued, then the width b can be limited to the edge length m of the pressure difference measuring cell. In this case, however, the dimension in the lengthwise direction rises significantly.

For $\Delta=0.3$: with $t\approx2$ mm and b=13 mm, the lengthwise direction can be limited to a=21.5 mm. The width b=13 mm causes a protrusion of the clamping body, for instance, 4.55 mm on both sides of the pressure difference measuring cell. This does limit the solid angle, via which the pressure difference measuring cell is accessible from the open sides of the clamping body. It does not, however, prohibit an electrical or hydraulic contacting of the measuring cell.

The invention claimed is:

1. A pressure difference sensor, comprising:
   a pressure difference measuring cell having a measuring membrane, a first platform, a second platform, and a transducer, and
   an elastic clamping apparatus, wherein:
   said measuring membrane is arranged between said first platform and said second platform and pressure-tightly connected with said two platforms;
   a first pressure chamber is formed between said measuring membrane and said first platform and a second pressure chamber is formed between said measuring membrane and said second platform;
   said first platform and said second platform each have a pressure duct, through which the particular pressure chamber is contactable with a first, respectively second, pressure;
   said transducer is provided for transducing a deformation of said measuring membrane dependent on a difference between said first pressure and said second pressure into an electrical signal;
   said clamping apparatus has a first clamping area, which acts on a first rear side of said first platform facing away from said measuring membrane, and a second clamping area, which acts on a second rear side of said second platform facing away from said measuring membrane;
   said clamping apparatus has at least one elastic element, via which said clamping areas are mechanically coupled, in order to clamp said pressure difference measuring cells with an axial clamping force;
   said first and second clamping areas are rigid;
   said clamping apparatus comprises a clamp with a first clamping body, which has said first clamping area and a second clamping body, which has said second clamping area;
   said first and/or said second clamping bodies have/has an elastic element;
   said first and said second clamping bodies are connected with one another under stress, in order to exert a clamping force on said pressure difference measuring cell;
   said two clamping bodies have a central, form retaining section, which includes said clamping areas; and
   said form retaining section of at least one clamping body has elastic sections adjoin, which form said elastic elements.

2. The pressure difference sensor as claimed in claim 1, wherein:
   said elastic elements comprise spring legs; and
   said axial clamping force, which acts on said platform, is applied by an elastic bending deflection of said spring legs from their resting position.

3. The pressure difference sensor as claimed in claim 1, wherein:

said platforms each have a chamber body, in which depressions for said pressure chambers are embodied, and, in each case, a stiffening element, wherein said stiffening elements are, in each case, arranged between said chamber bodies and said clamping areas.

4. The pressure difference sensor as claimed in claim 3, wherein:
said stiffening elements comprise a material, whose coefficient of thermal expansion differs by no more than 5 ppm/K from the coefficient of thermal expansion of the material of the chamber bodies.

5. The pressure difference sensor as claimed in claim 1, wherein:
pressure difference sensor is specified for a static overload pressure $p_L$; and
said measuring membrane has an area A loadable with said first or second pressure; and
said clamping force F, with which said clamping apparatus clamps the pressure difference measuring cell, can be expressed as $$F = S \cdot pL \cdot A,$$

wherein the safety factor S amounts to not less than 0.2.

6. The pressure difference sensor as claimed in claim 5, wherein:
said clamping force F fulfills the above mentioned conditions over a temperature range between 0° C. and 100° C.

7. The pressure difference sensor as claimed in claim 1, wherein:
said clamping force varies over a temperature range between 0° C. and 100° C. at a constant pressure, which is less than the overload pressure PL, by no more than the half the maximum clamping force in the temperature range.

8. The pressure difference sensor as claimed in claim 1, wherein:
said clamping bodies comprise a material, whose coefficient of thermal expansion deviates by no more than 5 ppm/K from the coefficient of thermal expansion of the material of the stiffening elements.

9. The pressure difference sensor as claimed in claim 1, wherein:
a maximum stress, which occurs in said clamping apparatus, is less than $\sigma_{02}$ of the material of the clamping apparatus in the vicinity of this maximum stress.

10. The pressure difference sensor as claimed in claim 9, wherein:
said clamping apparatus comprises a metal material, especially Kovar or steel.

11. The pressure difference sensor as claimed in claim 1, wherein:
said stiffening elements comprise single crystalline or polycrystalline silicon or a ceramic material, especially AlN, SiC, SiN, or cordierite.

12. The pressure difference sensor as claimed in claim 1, wherein:
said form retaining section of both clamping bodies, have elastic sections adjoin, which form said elastic elements.

13. The pressure difference sensor as claimed in claim 4, wherein:
said stiffening elements comprise a material, whose coefficient of thermal expansion differs by no more than 2 ppm/K, from the coefficient of thermal expansion of the material of the chamber bodies.

14. The pressure difference sensor as claimed in claim 5, wherein:
the safety factor S amounts to not less than 0.5.

15. The pressure difference sensor as claimed in claim 5, wherein:
the safety factor S amounts to not less than 0.8.

16. The pressure difference sensor as claimed in claim 6, wherein:
said clamping force F fulfills the above mentioned conditions over a temperature range between 20° C. and 150° C.

17. The pressure difference sensor as claimed in claim 6, wherein:
said clamping force F fulfills the above mentioned conditions over a temperature range between −40° C. and 180° C.

18. The pressure difference sensor as claimed in claim 7, wherein:
said clamping force varies over a temperature range between −20° C. and 150° C.

19. The pressure difference sensor as claimed in claim 7, wherein:
said clamping force varies over a temperature range between −40° C. and 180° C.

20. The pressure difference sensor as claimed in claim 7, wherein:
said constant pressure is less than the overload pressure PL by no more than ⅖ the maximum clamping force in the temperature range.

21. The pressure difference sensor as claimed in claim 7, wherein:
said constant pressure is less than the overload pressure PL by no more than ⅓ the maximum clamping force in the temperature range.

22. The pressure difference sensor as claimed in claim 8, wherein:
said clamping bodies comprise a material, whose coefficient of thermal expansion deviates by no more than 2 ppm/K from the coefficient of thermal expansion of the material of the stiffening elements.

23. The pressure difference sensor as claimed in claim 8, wherein:
said clamping bodies comprise a material, whose coefficient of thermal expansion deviated by no more than 1 ppm/K from the coefficient of thermal expansion of the material of the stiffening elements.

* * * * *